US012657657B2

(12) United States Patent
Li

(10) Patent No.: US 12,657,657 B2
(45) Date of Patent: Jun. 16, 2026

(54) VIDEO FRAME PLAYING METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventor: Zhicheng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 441 days.

(21) Appl. No.: 18/139,273

(22) Filed: Apr. 25, 2023

(65) Prior Publication Data

US 2023/0260084 A1 Aug. 17, 2023

Related U.S. Application Data

(63) Continuation of application No. PCT/CN2022/113526, filed on Aug. 19, 2022.

(30) Foreign Application Priority Data

Sep. 26, 2021 (CN) .......................... 202111130391.5

(51) Int. Cl.
*G06T 3/4053* (2024.01)
*A63F 13/52* (2014.01)
(Continued)

(52) U.S. Cl.
CPC ............ *G06T 3/4053* (2013.01); *A63F 13/52* (2014.09); *G06T 3/4007* (2013.01); *G06V 10/44* (2022.01); *H04N 13/351* (2018.05)

(58) Field of Classification Search
None
See application file for complete search history.

(56) References Cited

U.S. PATENT DOCUMENTS

2014/0087877 A1* 3/2014 Krishnan ................ G06T 11/00
463/33
2014/0321561 A1 10/2014 Stec et al.
(Continued)

FOREIGN PATENT DOCUMENTS

CN 104216783 A 12/2014
CN 106331750 A 1/2017
(Continued)

OTHER PUBLICATIONS

Zeng et al., "Single Image Super-Resolution With Learning Iteratively Non-Linear Mapping Between Low- and High-Resolution Sparse Representations", DOI: 10.1109/ICPR.2018.8545207 (Year: 2018).*

(Continued)

*Primary Examiner* — Chan S Park
*Assistant Examiner* — Promotto Tajrian Islam
(74) *Attorney, Agent, or Firm* — Morgan, Lewis & Bockius LLP

(57) ABSTRACT
This application discloses a video frame playing method performed by a computer device. According to an embodiment of this application, the computer device transmits network delay information to a cloud game server. The cloud game server then generates a plurality of first video frames based on the network delay information for rendering a target virtual scene at the computer device. After acquiring the plurality of first video frames, the computer device adjusts a resolution of the first video frames to obtain corresponding second video frames when resolutions of the plurality of first video frames meet resolution adjustment conditions, resolutions of the second video frames being higher than those of corresponding first video frames. Finally, the computer device plays a plurality of the second video frames.

14 Claims, 7 Drawing Sheets

A terminal acquires a plurality of first video frames, the plurality of first video frames being video frames obtained by rendering a target virtual scene by a cloud game server ⟩ 301

The terminal adjusts a resolution of each of first video frames in a case that resolutions of the plurality of first video frames meet resolution adjustment conditions to obtain corresponding second video frames, resolutions of the second video frames being higher than those of corresponding first video frames ⟩ 302

The terminal plays a plurality of the second video frames obtained by adjusting resolutions ⟩ 303

(51) Int. Cl.
G06T 3/4007 (2024.01)
G06V 10/44 (2022.01)
H04N 13/351 (2018.01)

(56) References Cited

U.S. PATENT DOCUMENTS

| | | | | |
|---|---|---|---|---|
| 2019/0141374 A1* | 5/2019 | McAuley | ........... | H04N 21/6373 |
| 2020/0162789 A1 | 5/2020 | Ma et al. | | |
| 2021/0093960 A1* | 4/2021 | Cerny | .................. | H04N 19/142 |
| 2023/0285857 A1* | 9/2023 | Yuan | ..................... | A63F 13/537 |

FOREIGN PATENT DOCUMENTS

| | | | | | |
|---|---|---|---|---|---|
| CN | 107154019 A | * | 9/2017 | ........... | G06T 3/4053 |
| CN | 108694376 A | | 10/2018 | | |
| CN | 109803175 A | * | 5/2019 | | |
| CN | 110149371 A | | 8/2019 | | |
| CN | 110881136 A | * | 3/2020 | ....... | H04N 21/23805 |
| CN | 111681167 A | | 9/2020 | | |
| CN | 111970513 A | | 11/2020 | | |
| CN | 112565887 A | * | 3/2021 | ............ | G06N 3/045 |
| CN | 113055742 A | | 6/2021 | | |
| CN | 113423018 A | | 9/2021 | | |
| CN | 113842635 A | | 12/2021 | | |
| CN | 114240749 A | | 3/2022 | | |
| WO | WO 2021065629 A1 | | 4/2021 | | |

OTHER PUBLICATIONS

Lai et al., "Deep Laplacian Pyramid Networks for Fast and Accurate Super-Resolution", DOI: https://doi.org/10.48550/arXiv.1704.03915, Year: 2017 (Year: 2017).*

Tencent Technology, ISR, PCT/CN2022/113526, Nov. 21, 2022, 3 pgs.

Tencent Technology, WO, PCT/CN2022/113526, Nov. 21, 2022, 6 pgs.

Tencent Technology, IPRP, PCT/CN2022/113526, Mar. 26, 2024, 7 pgs.

* cited by examiner

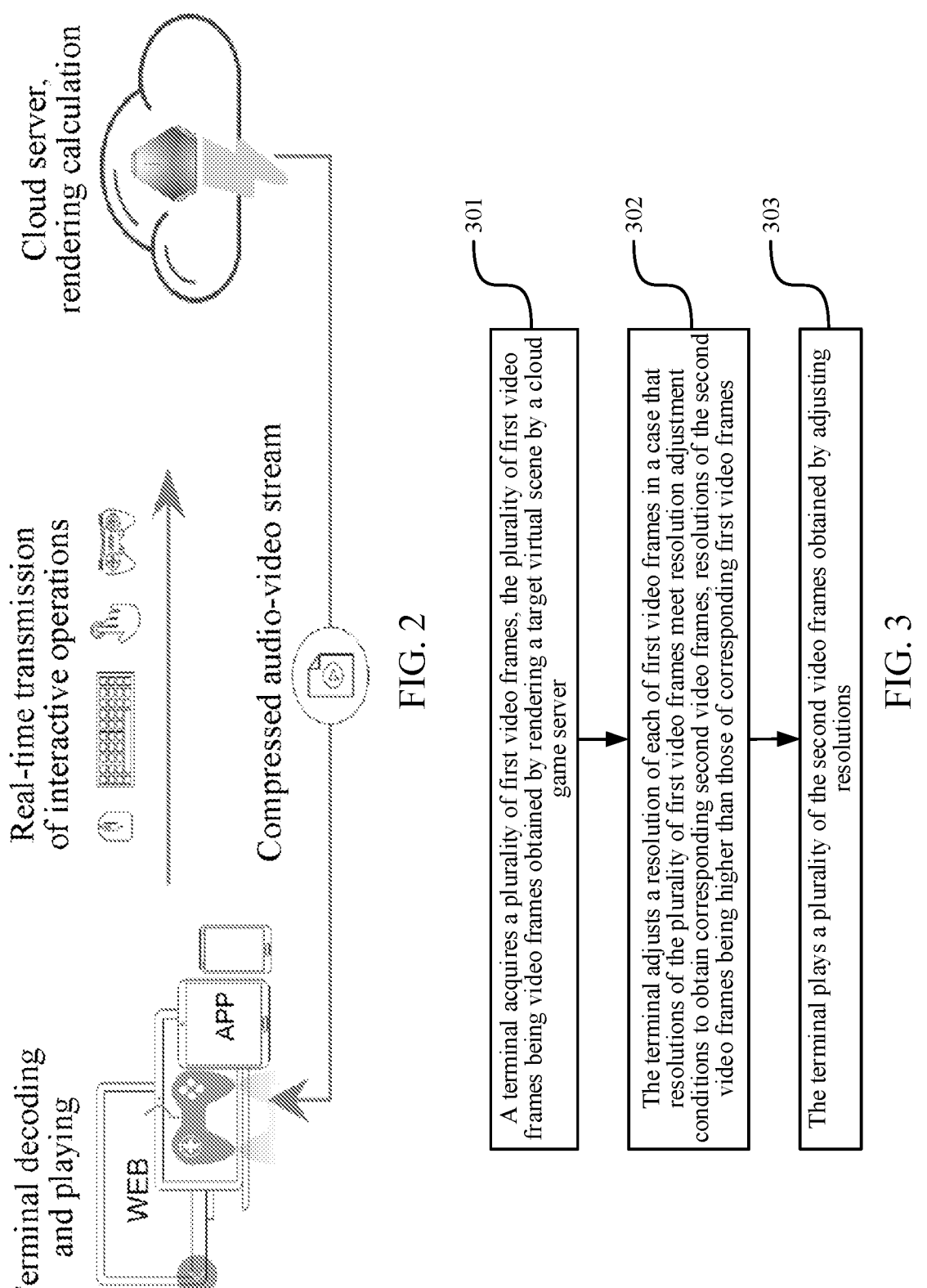

Cloud server, rendering calculation

Real-time transmission of interactive operations

Compressed audio-video stream

Terminal decoding and playing

WEB

APP

A terminal acquires a plurality of first video frames, the plurality of first video frames being video frames obtained by rendering a target virtual scene by a cloud game server

302

The terminal adjusts a resolution of each of first video frames in a case that resolutions of the plurality of first video frames meet resolution adjustment conditions to obtain corresponding second video frames, resolutions of the second video frames being higher than those of corresponding first video frames

303

The terminal plays a plurality of the second video frames obtained by adjusting resolutions

FIG. 3

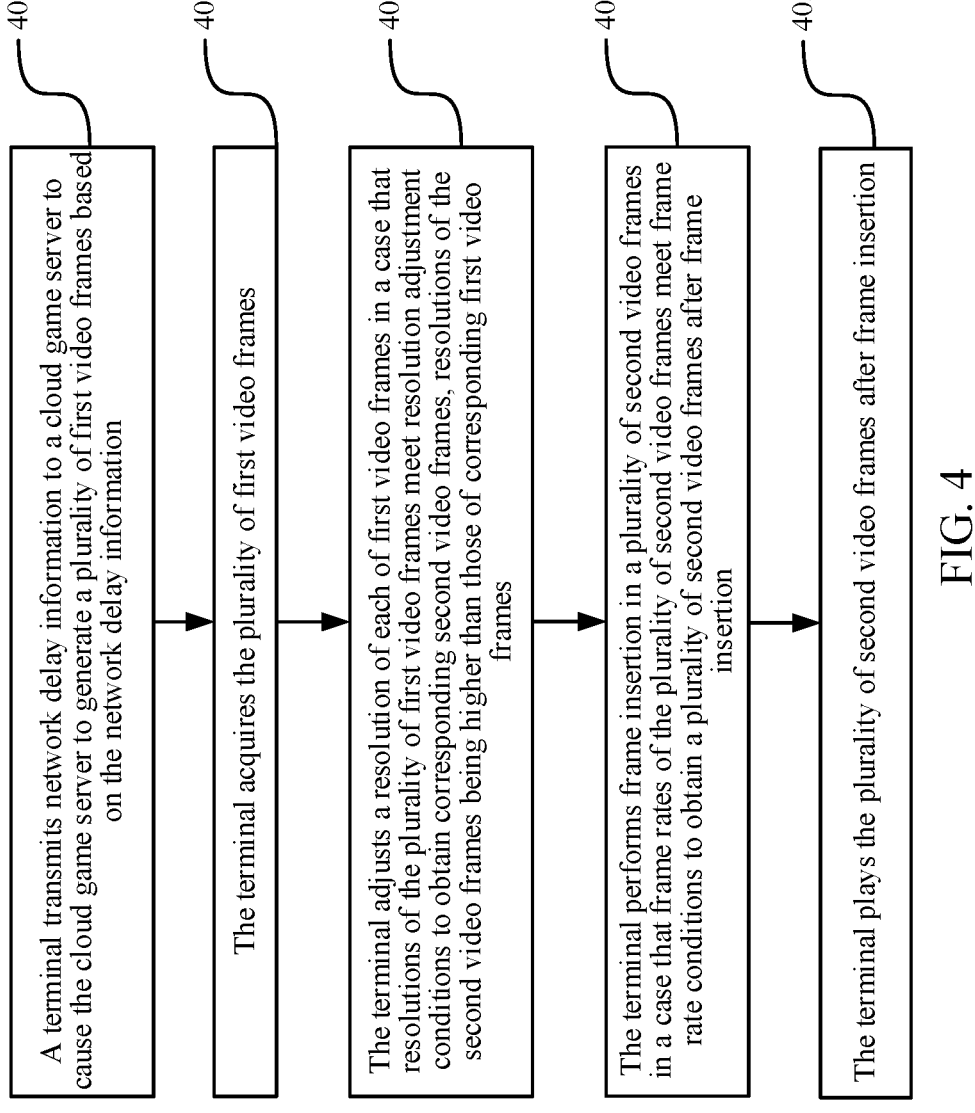

401 A terminal transmits network delay information to a cloud game server to cause the cloud game server to generate a plurality of first video frames based on the network delay information 402 The terminal acquires the plurality of first video frames 403 The terminal adjusts a resolution of each of first video frames in a case that resolutions of the plurality of first video frames meet resolution adjustment conditions to obtain corresponding second video frames, resolutions of the second video frames being higher than those of corresponding first video frames 404 The terminal performs frame insertion in a plurality of second video frames in a case that frame rates of the plurality of second video frames meet frame rate conditions to obtain a plurality of second video frames after frame insertion 405 The terminal plays the plurality of second video frames after frame insertion

FIG. 4

VIDEO FRAME PLAYING METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/113526, entitled "VIDEO FRAME PLAYING METHOD AND APPARATUS, DEVICE, STORAGE MEDIUM, AND PROGRAM PRODUCT" filed on Aug. 19, 2022, which claims the priority of Chinese Patent Application No. 202111130391.5, entitled "VIDEO FRAME PLAYING METHOD AND APPARATUS, DEVICE, STORAGE MEDIUM, AND PROGRAM PRODUCT" filed on Sep. 26, 2021, all of which is incorporated by reference in its entirety.

FIELD OF THE TECHNOLOGY

This application relates to the fields of computer technology and cloud games, in particular to a video frame playing method and apparatus, a device, a storage medium, and a program product.

BACKGROUND OF THE DISCLOSURE

With the maturity of cloud computing technology, users can achieve tasks that terminals are difficult to complete through cloud computing. For example, in the field of cloud games, the terminal does not need to perform a rendering operation, and a cloud game server can render a game scene based on control information transmitted by the terminal to obtain a video frame. The cloud game server transmits the video frame to the terminal, and the terminal displays the video frame.

In the related art, when the terminal is in a poor network state, the cloud game server may reduce a resolution of the video frame to ensure the fluency of the cloud game, but reducing the resolution of the video frame may result in a poor display effect of the cloud game.

SUMMARY

Embodiments of this application provide a video frame playing method and apparatus, a device, a storage medium, and a program product, which can improve the clarity of a cloud game picture displayed by a terminal on the premise of ensuring the fluency of the cloud game.

This embodiment of this application provides a video frame playing method performed by a computer device, the method including:

transmitting network delay information to a cloud game server;

acquiring a plurality of first video frames from the cloud game server, wherein the cloud game server generates the plurality of first video frames based on the network delay information for rendering a target virtual scene;

when resolutions of the plurality of first video frames meet resolution adjustment conditions, adjusting a resolution of the first video frames to obtain corresponding second video frames, resolutions of the second video frames being higher than those of corresponding first video frames; and playing a plurality of the second video frames.

This embodiment of this application provides a computer device, including one or more processors and one or more memories, the one or more memories having stored therein at least one computer program that, when executed by the one or more processors, causes the computer device to implement the video frame playing method provided by this embodiment of this application.

This embodiment of this application provides a non-transitory computer-readable storage medium having stored therein at least one computer program that, when executed by a processor of a computer device, causes the computer device to implement the video frame playing method provided by this embodiment of this application.

The embodiments of this application have the following beneficial effects:

According to the technical solutions provided by the embodiments of this application, after the plurality of first video frames transmitted by the cloud game server are acquired, the resolutions of the plurality of first video frames are determined. The resolution of each of first video frames are adjusted when the resolutions meet resolution adjustment conditions, to improve the resolutions of the first video frames to obtain the corresponding second video frames. Then the plurality of second video frames obtained by adjusting the resolutions of the first video frames are played. Compared with directly playing the plurality of first video frames transmitted by the cloud game server, the clarity of the cloud game picture is improved. Therefore, on the premise of ensuring the fluency of the cloud game, the display effect of the cloud game is improved.

BRIEF DESCRIPTION OF THE DRAWINGS

FIG. 2 is a basic flowchart of a cloud game provided by an embodiment of this application;

FIG. 3 is a flowchart of the video frame playing method provided by an embodiment of this application.

FIG. 4 is a flowchart of the video frame playing method provided by an embodiment of this application.

DESCRIPTION OF EMBODIMENTS

Figure 1:
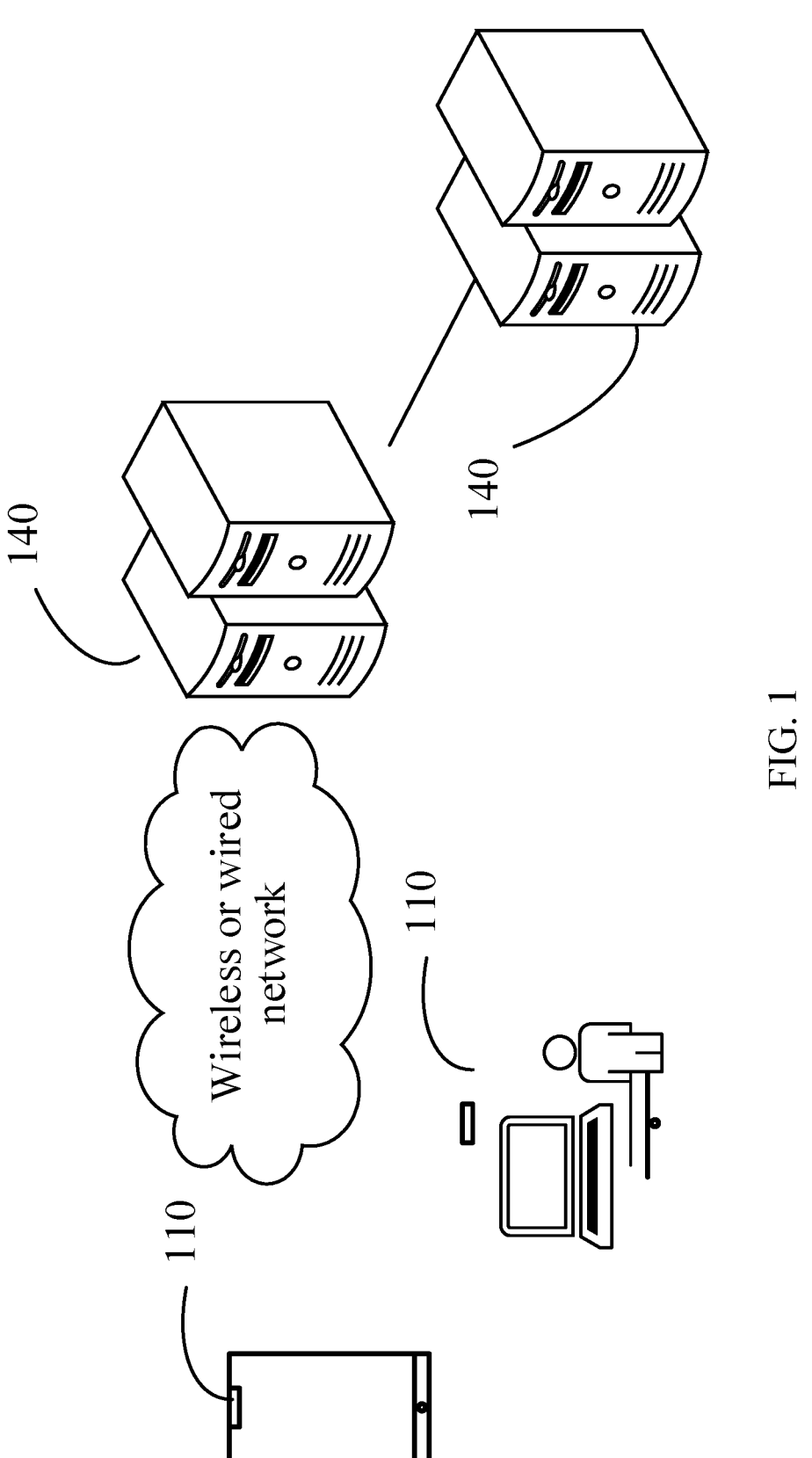
FIG. 1 is a schematic diagram of an implementation environment of a video frame playing method provided by an embodiment of this application.

In order to make the purpose, technical scheme and advantages of this application clearer, implementations of this application will be described in detail with the attached drawings.

In this application, the terms "first" and "second" are used to distinguish the same or similar items with basically the same function. It is to understood that there is no logical or chronological dependency among "first", "second" and "nth", and there is no restriction on the number and execution order.

In this application, the term "at least one" refers to one or more, and "a plurality of" refers to two or more. For example, a plurality of reference face images refer to two or more reference face images.

The following description refers to "some embodiments", which describe subsets of all possible embodiments, but it is understood that "some embodiments" may be the same subset or different subsets of all possible embodiments, and may be combined with each other without conflict.

Before the embodiments of this application are further described in detail, a description is made on nouns and terms in the embodiments of this application, and the nouns and terms in the embodiments of this application are applicable to the following explanations.

1). Cloud gaming, also known as gaming on demand, is an on-line game technology based on a cloud computing technology. A cloud game technology enables thin client with relatively limited graphics processing and data computing capabilities to run high-quality games. In a cloud game scene, the game is not run in a player gaming terminal, but is run in a cloud game server, and the cloud game server renders the game scene into a video audio stream for transmission to a player's game terminal through a network. The player's game terminal does not need to have powerful graphics operation and data processing capabilities, but only needs to have the ability to play basic streaming media, the ability to obtain player input instructions and transmit them to the cloud game server, and the ability to process basic data.

2). A virtual scene is a virtual scene that is displayed (or provided) when an application runs on a terminal. The virtual scene may be a simulation environment for a real world, a semi-simulation semi-fictional virtual environment, or a purely fictional virtual environment. The virtual scene may be any one of a two-dimensional virtual scene, a 2.5-dimensional virtual scene, or a three-dimensional virtual scene, and the dimensions of the virtual scene are not limited in the embodiments of this application. For example, the virtual scene may include a sky, a land, a sea, and the like. The land may include an environmental element such as a desert, a city, and the like, and a user may control a virtual object to move in the virtual scene.

3). A virtual object refers to a movable object in the virtual scene. The movable object may be a virtual character, a virtual animal, an animation character, and the like, such as a person, an animal, a plant, an oil bucket, a wall, a stone, and the like, displayed in the virtual scene. The virtual object may be a virtual avatar in the virtual scene for representing a user. A plurality of virtual objects may be included in the virtual scene, each virtual object having its own shape and volume in the virtual scene, occupying a portion of the space in the virtual scene.

In some embodiments, the virtual object is a user character controlled by operations on the client, or an artificial intelligence (AI) set in the virtual scene by training, or a non-player character (NPC) set in the virtual scene. In some embodiments, the virtual object is a virtual character competing in the virtual scene. In some embodiments, the number of virtual objects participating in the interaction in the virtual scene is preset or dynamically determined based on the number of clients participating in the interaction.

Taking a shooting game as an example, the user can control a virtual object to freely fall, glide or open a parachute to fall in the sky of the virtual scene; run, jump, crawl, bend forwards on land; and swim, float or dive in the sea. Of course, the user can also control the virtual object to move in the virtual scene with a virtual carrier, for example, the virtual carrier can be a virtual automobile, a virtual aircraft, and a virtual yacht. Only the above scene is taken as an example herein, and this embodiment of this application does not limit this. The user may also control the interaction between virtual objects and other virtual objects through interaction props with fighting, for example, the interaction prop may be a throwing interaction prop such as a virtual grenade, a virtual cluster mine, and a virtual sticky grenade (referred to as "sticky grenade"), and may also be a shooting interaction prop such as a virtual machine gun, a virtual hand gun, and a virtual rifle. This application does not limit the types of interactive props.

4). Display resolution: resolution mainly refers to the number of pixels that a display can display, which can be classified from two directions: a display resolution and an image resolution. Display resolution (screen resolution) is the precision of screen image, which refers to the number of pixels that can be displayed by the display. Because the dots, lines and surfaces on the screen are all composed of pixels, the more pixels the display can display, the finer the picture will be, and the more information can be displayed in the same screen area, so the resolution is one of the very important performance indicators. The whole image can be imagined as a large chessboard, and the resolution is expressed by the number of intersections of all meridians and latitudes. When the display resolution is determined, the smaller the display screen, the clearer the image. Otherwise, when the display screen size is fixed, the higher the display resolution, the clearer the image. The image resolution is the number of pixels contained in a unit inch, which is defined more closely to the definition of resolution itself.

5). Frame insertion is to add one frame to every two of frames displayed in the original picture. The display time of each frame is shortened, the time is reduced to half, for example, a video frame rate is increased from the original 30 Hz to 60 HZ. The illusion caused by the persistence of human vision is corrected to effectively improve the stability of the picture.

6). Super-resolution relates to a method for improving the image resolution. Based on the motion prediction or transportation compensation of the auxiliary reference frame of the chronological neighbor frame and a related depth learning model, a technical scheme of up-sampling any low-resolution to Nx (such as 2x) times resolution is provided, for example, 2K is performed super-resolution to 4K resolution.

7). Mean opinion score (MOS) is the subjective score obtained after the subjective evaluation experiment, ranges from 0 to 100, and the greater the value, the better the subjective feeling.

8). Frames per second (FPS) can be understood as "refresh rate (in Hz)". FPS, which is a definition in the field of images, refers to the number of picture frames transmitted per second, generally speaking refers to the number of pictures in animation or video. FPS is to measure the amount of information used for saving and displaying dynamic video. The greater the number of frames per second, the more fluent the motion is displayed.

9). A sequence parameter set is abbreviated as SPS. A set of global parameters for a coded video sequence is stored in SPS. The so-called coded video sequence is a sequence composed of the coded pixel data of the original video frame by frame.

FIG. 1 is a schematic diagram of an implementation environment of a video frame playing method provided by an embodiment of this application. Referring to FIG. 1, the implementation environment may include a terminal 110 and cloud game servers 140. In some embodiments, the terminal 110 and the cloud game servers 140 are nodes in a block chain system, and data transmitted between the terminal 110 and the servers 140 is stored on the block chain.

The terminal 110 is connected to the cloud game servers 140 through a wireless network or a wired network. In some embodiments, the terminal 110 is a smart phone, a tablet computer, a notebook computer, a desktop computer, a smart speaker, a smart watch, and the like, but it is not limited to this. The terminal 110 is installed and operated with a client supporting virtual scene display.

The cloud game server 140 is an independent physical cloud game server, or a cloud game server cluster or distributed system composed of a plurality of physical cloud game servers, or a cloud game server providing basic cloud computing services, such as a cloud service, a cloud database, a cloud computing, a cloud function, a cloud storage, a network service, a cloud communication, a middle ware service, a domain name service, a security service, a content delivery network (CDN), large data and an artificial intelligence platform, and the like. In some embodiments, the cloud game server 140 is also called an edge computing node.

In some embodiments, the terminal 110 generally refers to one of a plurality of terminals, and this embodiment of this application is illustrated with the terminal 110 only.

A person skilled in the art would know that the number of the above terminals may be more or less. For example, the above terminal is only one, or the above terminal is several tens or several hundreds, or more, and other terminals are also included in the above implementation environment. This embodiment of this application does not limit the number of terminals and the types of devices.

After the application scene of the video frame playing method provided by this embodiment of this application is introduced, the application scene of the video frame playing method provided by this embodiment of this application will be described below in conjunction with the above implementation environment. During the following description, the terminal is the above terminal 110, and the cloud game server is the above cloud game server 140.

The video frame playing method provided by this embodiment of this application can be applied in various cloud game scenes, such as a first-person shooting (FPS) game, or a third-personal shooting (TPS) game, or a multiplayer on-line battle arena (MOBA), or a war chess game, or a self-propelled chess game, and this embodiment of this application does not limit this.

Taking the application of the video frame playing method provided by this embodiment of this application in an FPS game as an example, the user starts a cloud game client on a terminal, and logs in a user account in the cloud game client, that is, the user inputs a user account and a corresponding password in the cloud game client, and clicks a login control to log in. In response to detecting a click operation on the login control, the terminal transmits a login request to the cloud game server, and a login request carries the user account and the corresponding password. After the login request is received, the cloud game server acquires the user account and the corresponding password from the login request, and verifies the user account and the corresponding password. After the user account and the corresponding password are verified, the cloud game server transmits login success information to the terminal. After the login success information is received, the terminal transmits a cloud game acquisition request to the cloud game server, and the cloud game acquisition request carries the user account. After the cloud game acquisition request is acquired, the cloud game server queries based on the user account carried in the cloud game acquisition request, acquires a plurality of cloud games corresponding to the user account, and transmits logos of the plurality of cloud games to the terminal, and the terminal displays the logos of the plurality of cloud games in the cloud game client. Through the terminal, the user selects a logo of the FPS game wanting to play from the logos of a plurality of cloud games displayed in the cloud game client, that is, selects the FPS game wanting to play. After the user selects the FPS game in the cloud game client, the terminal transmits a game start instruction to the cloud game server, which carries the user account number, the logo of the FPS game, and hardware information of the terminal. The hardware information of the terminal includes a screen resolution of the terminal, a model of the terminal, and the like, and this embodiment of this application does not limit this. After the game start instruction is received, the cloud game server acquires the user account number, the logo of the FPS game, and the hardware information of the terminal from the game start instruction. The cloud game server initializes the FPS game based on the hardware information of the terminal to implement the matching between the rendered game picture and the terminal. The cloud game server starts the FPS game. During running the FPS game, the user can control a controlled virtual object in the FPS to move through the terminal, that is, the terminal transmits control information of the controlled virtual object to a cloud game server, and the cloud game server renders the virtual scene of the FPS based on the control information to obtain a first video frame. Referring to FIG. 2, the terminal transmits interactive operations (control information) to the cloud server (cloud game server) in real-time. The cloud server performs rendering calculation based on the received interactive operations, and returns a compressed audio-video stream to the terminal. The terminal decodes and plays the received audio-video streams.

In some embodiments, the cloud game server refers to network delay information of the terminal in addition to the screen resolution and the model of the terminal when rendering the virtual scene. If the network delay information of the terminal indicates that the current network delay of the terminal is high, then the cloud game server can render the virtual scene with a low quality, and the resolution of the obtained first video frame is also low. Accordingly, the network bandwidth occupied by the first video frame is also smaller, which ensures the fluency of FPS games running on the terminal to the greatest extent. For example, when the terminal network delay is low, the resolution of the first video frame rendered by the cloud game server is 1080 p. When the terminal network delay is high, the resolution of the first video frame rendered by the cloud game server can be reduced to 720 p. When the resolutions of the first video frames decrease, the terminal can adjust the resolutions of the received first video frames by using the video frame playing method provided by this embodiment of this application to improve the resolution of the first video frame and obtain the second video frame. Compared with the first video frame, the second video frame after resolution adjustment has a higher resolution, which means that the second video frame has a better display effect. In this way, when the terminal network fluctuates, the display effect of the PFS can be improved on the premise of ensuring the fluency of the FPS. Especially for terminals that are unstable in the network but have a certain computing power, the user's game experience can be improved.

In some embodiments, when the cloud game server transmits a first video frame to the terminal, it will not transmit frame by frame, but will render a video frame sequence. The video frame sequence includes a plurality of first video frames, and the cloud game server transmits the video frame sequence to the terminal each time for the terminal to display. When the network delay information of the terminal indicates that the current network delay of the terminal is high, the cloud game server can not only reduce the resolution of the first video frame obtained by rendering, but also reduce the number of the first video frames in the video frame sequence, that is, reduce the frame rate at which the terminal is displaying the first video frame. For example, when the network delay of the terminal is low; the video frame sequence carries 60 first video frames, which are uniformly displayed by the terminal within 1 s, and the frame rate at this time is 60. When the network delay of the terminal is low, the number of first video frames carried by the video frame sequence is reduced to 30, and the three first video frames are uniformly displayed by the terminal within 1 s, and the frame rate at this time is 30. It can be seen that the number of transmitted video frames can be reduced by reducing the frame rate, which reduces the bandwidth occupied by the transmitted video frames, but reducing the frame rate results in "interruption" of the display. In this case, the terminal can use the video frame playing method provided by this embodiment of this application to perform frame insertion in the received video frame sequence to increase the number of video frames in the video frame sequence, eliminate "interruption", and improve the playing effect of video frames.

In addition, for an MOBA game, a TPS game, a war chess game, and a self-propelled chess game, the above steps can be used for processing, and will not be described in detail herein.

Furthermore, the video frame playing method provided by this embodiment of this application can also be applied to other types of cloud games in addition to the above FPS game, the MOBA game, the war chess game, or the self-propelled chess game, and this embodiment of this application does not limit this.

After the implementation environment and application scene of the video frame playing method provided by this embodiment of this application is introduced, the video frame playing method provided by this embodiment of this application will be described below.

FIG. 3 is a flowchart of the video frame playing method provided by an embodiment of this application. Referring to FIG. 3, the method includes the following.

301. A terminal acquires a plurality of first video frames, the plurality of first video frames being video frames obtained by rendering a target virtual scene by a cloud game server.

Here, a client, such as a game client or other clients with a game function (such as an instant messaging client), runs on the terminal. When the user plays games based on the client, the game picture displayed by the terminal is obtained by rendering the virtual scene through the cloud game server. In practical applications, a cloud game server can render a target virtual scene from the perspective of a controlled virtual object in the target virtual scene to obtain a video frame to be displayed by a terminal.

The cloud game server renders the target virtual scene to obtain a plurality of video frames, which can exist in the form of video frame sequences, and transmits the video frame sequences to the terminal.

The controlled virtual object is also a virtual object controlled by a terminal, namely, a virtual object corresponding to a user account registered by a client. Rendering the target virtual scene from the perspective of the controlled virtual object in the target virtual scene means: rendering pictures observed by the controlled virtual object in the target virtual scene to obtain a first video frame. The pictures observed by the controlled virtual object in the virtual scene are also pictures seen by the user.

302. The terminal adjusts a resolution of each of first video frames when resolutions of the plurality of first video frames meet resolution adjustment conditions to obtain corresponding second video frames, resolutions of the second video frames being higher than those of corresponding first video frames.

In some embodiments, after a plurality of video frames (a video frame sequence) transmitted by a cloud game server are received, the terminal acquires the resolutions of the plurality of video frames. In some embodiments, the resolutions of the plurality of video frames are the same, and the terminal compares the resolutions of the plurality of video frames with a resolution threshold to obtain a comparison result. Moreover, when the comparison result indicates that the resolutions of the plurality of first video frames are less than or equal to the resolution threshold, the resolutions of the plurality of first video frames are determined to meet the resolution adjustment conditions.

The process of adjusting the resolution of a plurality of first video frames by the terminal is also a process of performing super-resolution on the plurality of first video frames. The super-resolution can improve the resolution of the first video frames, the terminal, improves the clarity of the cloud game picture, that is, improves the display effect of the video frames, compared with directly playing the plurality of first video frames transmitted by the cloud game server.

303. The terminal plays a plurality of the second video frames obtained by adjusting resolutions.

The second video frame is obtained after the terminal adjusts the resolution of the first video frame, then the second video frame has the same image content as the corresponding first video frame. Compared with displaying the first video frame, because the second video frame has a higher resolution, the terminal will have a higher definition when displaying the second video frame, thus having a better display effect.

According to the technical solutions provided by this embodiment of this application, after the plurality of first video frames transmitted by the cloud game server are acquired, the resolutions of the plurality of first video frames are determined. The resolution of each of first video frames are adjusted when the resolutions meet resolution adjustment conditions, to improve the resolutions of the first video frames to obtain the corresponding second video frames, so the plurality of second video frames have higher resolutions. Therefore, on the premise of ensuring the fluency of the cloud game, the display effect of the cloud game is improved.

The technical solution provided by the embodiments of this application will be described more clearly with reference to some examples. Referring to FIG. 4, the method includes:

401. A terminal transmits network delay information to a cloud game server to cause the cloud game server to generate a plurality of first video frames based on the network delay information.

Here, the first video frame is a video frame obtained by rendering the target virtual scene by the cloud game server from the perspective of the controlled virtual object in the target virtual scene.

The network delay information is used for indicating the network delay between the terminal and the cloud game server. The target virtual scene is also a game scene of a cloud game selected by a user, and a visual angle of a controlled virtual object is a visual angle of a virtual camera of the controlled virtual object. In an FPS game, the virtual camera of the controlled virtual object is located at the head of the controlled virtual object. When a user controls the controlled virtual object to move in the target virtual scene through a terminal, the virtual camera also moves with the movement of the controlled virtual object; and a picture taken by the virtual camera is also a picture observed by the controlled virtual object in the target virtual scene. In a TPS game, a virtual camera of a controlled virtual object is located above the controlled virtual object. When a user controls the controlled virtual object to move in a target virtual scene through a terminal, the virtual camera also moves with the movement of the controlled virtual object, and a picture taken by the virtual camera is also a picture observed above the controlled virtual object. In a cloud game scene, a picture shot by the virtual camera is rendered by a cloud game server. Because there is a plurality of pictures which are continuous chronologically during a game, the plurality of pictures are called video frames in this application.

In some embodiments, the terminal starts the cloud game client, acquires network delay information between the terminal and the cloud game server through the cloud game client, and transmits the network delay information to the cloud game server. After the network delay information is received, the cloud game server determines a corresponding rendering parameter according to the network delay information, and uses the rendering parameter to render the target virtual scene from the perspective of the controlled virtual object in the target virtual scene to obtain a plurality of first video frames.

In such an implementation, the terminal can transmit the network delay information to the cloud game server; the cloud game server can determine a rendering parameter based on the network delay information, which can reflect the current network condition of the terminal; and a video frame rendered using the rendering parameter is adapted to the network condition of the terminal, thereby ensuring the fluency of the terminal running the cloud game.

The above implementations are described below by two examples.

Example 1. A terminal starts a cloud game client, and transmits a probe packet to the cloud game server through the cloud game client, the probe packet being used for requesting the cloud game server to return a confirmation packet. The terminal determines the time difference between the received confirmation packet and the transmitted probe packet as the network delay information through the cloud game client, and transmits the network delay information to the cloud game server. After the network delay information is received, the cloud game server determines a rendering parameter corresponding to the network delay information, and the rendering parameter is used for indicating the resolution of a rendered video frame. The cloud game server uses the rendering parameter to render the target virtual scene from the perspective of the controlled virtual object in the target virtual scene to obtain a plurality of first video frames.

When the cloud game server uses the rendering parameter to render the target virtual scene from the perspective of the controlled virtual object in the target virtual scene, the rendering is completed by a graphics processing unit (GPU) of the cloud game server. When the graphic processor of the cloud game server renders the target virtual scene, a plurality of rendered game pictures are stored in the display memory.

In order to improve processing efficiency and reduce delay, the graphic processor of the cloud game server directly encodes a plurality of game pictures in the display memory to obtain a plurality of first video frames. In some embodiments, the graphic processor of the cloud game server can encode a plurality of game pictures in the display memory into a first video frame in a format such as VP8 (a video format developed and launched by Google)/VP9 (a video format developed and launched by Google)/H. 264/H. 265/ advanced video encoding (AVC)/audio video coding standard (AVS), and this embodiment of this application does not limit this. In addition, for the audio data corresponding to the game picture, the cloud game server can also encode the audio data into an audio data stream in a format such as Silk (an audio format developed by Microsoft)/Opus (an open-source audio format)/advanced audio coding (AAC).

Example 2. A terminal starts a cloud game client, and transmits a test data download request to the cloud game server through the cloud game client. The test data download request is used for requesting to download test data from the cloud game server. The terminal downloads the test data from the cloud game server through the cloud game client, and the duration of the download is set by a person skilled in the art according to actual situations, for example, such as 1 s or 3 s, and this embodiment of this application does not limit this. The terminal divides the downloaded data amount by the download time to obtain the network delay information. The terminal transmits the network delay information to the cloud game server. After the network delay information is received, the cloud game server determines a rendering parameter corresponding to the network delay information, and the rendering parameter is used for indicating the resolution of a rendered video frame. The cloud game server uses the rendering parameter to render the target virtual scene from the perspective of the controlled virtual object in the target virtual scene to obtain a plurality of first video frames.

In the above implementation, taking the case where the terminal has just started the cloud game client as an example, the process of the terminal running the cloud game through the cloud game client is described below.

In some embodiments, when the cloud game is run on the cloud game client, the terminal transmits control information and network delay information of the controlled virtual object to the cloud game server through the cloud game client. After the control information and the network delay information are received, the cloud game server determines a viewing angle of the controlled virtual object in the target virtual scene based on the control information, and determines corresponding rendering parameters based on the network delay information. The cloud game server renders the target virtual scene based on the rendering parameters and the visual angle of the controlled virtual object to obtain a first video frame.

The control information of the controlled virtual object is used for changing the position, orientation and action of the controlled virtual object in the target scene. For example, the control information can control the controlled virtual object to move forwards, backwards, left and right in the target virtual scene, or can control the controlled virtual object to rotate left or right in the target virtual scene, or can control the controlled virtual object to perform actions such as squatting, creeping and using a virtual prop in the target virtual scene. Of course, when the cloud game server controls the controlled virtual object to move or perform an action in the target virtual scene based on the control information, the virtual camera bound with the controlled virtual object will also move with the movement of the controlled virtual object, the view angle of the controlled virtual object observing the target virtual scene will change when the controlled virtual object moves or performs the action, and the virtual camera bound with the controlled virtual object can record this change.

In the above two implementations, the terminal transmits the network delay information to the cloud game server, and the cloud game server determines the corresponding rendering parameters based on the network delay information as an example for explanation, and the cloud game server determines the rendering parameters based on other modes as follows.

In some embodiments, the terminal starts the cloud game client and obtains the network delay information between the terminal and the cloud game server through the cloud game client. The terminal determines video stream information based on the network delay information, which includes a resolution, a code rate, and a frame rate of the video stream. The video stream includes a plurality of video sequences, and each video sequence includes a plurality of first video frames. In some embodiments, the first video frames in the same video sequence are rendered by the cloud game server with the same rendering parameters, that is, the resolutions of the first video frames in the same video sequence are the same. The first video frames in different video sequences may be rendered by the cloud game server with different rendering parameters, that is, the resolutions of the first video frames in different video sequences may be different. The terminal transmits the video stream information to the cloud game server, which receives the video stream information and determines the corresponding rendering parameters based on the video stream information. The cloud game server uses the rendering parameter to render the target virtual scene from the perspective of the controlled virtual object in the target virtual scene to obtain a plurality of first video frames.

In such an implementation, after the network delay information is acquired, the terminal can directly determine the video stream information based on the network delay information, and the cloud game server can quickly determine the corresponding rendering parameters based on the video stream information directly, with high efficiency.

In some embodiments, the terminal starts the cloud game client and obtains the network delay information between the terminal and the cloud game server through the cloud game client. The terminal displays a video stream information selection page based on the network delay information. The video stream information selection page displays a plurality of candidate video stream information that matches the network delay information. In response to the selection of target video stream information among a plurality of video stream information, the terminal transmits the target video stream information to the cloud game server, which receives the target video stream information and determines corresponding rendering parameters based on the target video stream information. The cloud game server uses the rendering parameter to render the target virtual scene from the perspective of the controlled virtual object in the target virtual scene to obtain a plurality of first video frames.

In such an implementation, after the network delay information is acquired, the terminal can provide a user with a plurality of optional video stream information based on the network delay information, and the process of selecting the video stream information by users is a process of selecting a resolution, a frame rate and a code rate, thus providing the users with higher autonomy.

Of course, in the process of playing the cloud game, the user can also adjust the selected video stream information at any time through the cloud game client, and the cloud game server can also adjust the rendering parameters accordingly.

402. The terminal acquires the plurality of first video frames.

A plurality of first video frames belong to the same video frame sequence, and the plurality of first video frames are obtained after the cloud game server renders the target virtual scene based on the same rendering parameters, that is, the first video frames have the same resolution. Because a plurality of first video frames are obtained after a cloud game server encodes a game picture, the video frame sequence is a coded video sequence (CVS).

In some embodiments, when the cloud game server obtains the coded video sequence, it also obtains a sequence parameter set (SPS) corresponding to the encoded video sequence from the server, which is used for instructing the terminal how to decode the encoded video sequence. The terminal decodes the encoded video frame sequence based on the sequence parameter set to obtain a plurality of first video frames.

403. The terminal adjusts a resolution of each of first video frames when resolutions of the plurality of first video frames meet resolution adjustment conditions to obtain corresponding second video frames, resolutions of the second video frames being higher than those of corresponding first video frames.

In practical applications, after a first video frame sequence transmitted by a cloud game server is received, a terminal acquires the resolution of each first video frame in the first video frame sequence. In some embodiments, the resolutions of the first video frames in the first video frame sequence are the same, and the terminal compares the resolutions of the plurality of video frames with a resolution threshold to obtain a comparison result. Moreover, when the comparison result indicates that the resolutions of the plurality of first video frames are less than or equal to the resolution threshold, the resolutions of the plurality of first video frames are determined to meet the resolution adjustment conditions.

The terminal determines a reference pixel point between every two pixel points in one or more of, or in some embodiments, each of the first video frames when the resolutions of the plurality of first video frames meet the resolution adjustment conditions and inserts the reference pixel point between the every two pixel points to obtain second video frames corresponding to the one or more of, or in some embodiments, each of the first video frames, the reference pixel point being generated based on the every two pixel points. Every two pixels in the first video frame described herein refers to two pixels that are spatially adjacent in the first video frame.

In such an implementation, the terminal can insert a reference pixel point between every two pixel points in the first video frame for each of first video frames. The super-resolution of the first video frame is implemented by inserting reference pixel points, and the obtained second video frame has a higher resolution, and the terminal has a better effect when displaying the second video frame than the corresponding first video frame.

In some embodiments, the resolution meeting the resolution adjustment condition means that the resolution is less than or equal to a resolution threshold, which is set by a person skilled in the art according to actual situations, or by a user according to the computing capability of the terminal, and this embodiment of this application does not limit this.

In some embodiments, the terminal may adjust the resolution of the first video frame in the following ways to obtain the corresponding second video frame.

The terminal uses a nearest interpolation method to insert the reference pixel point between every two pixel points in each of the first video frames to obtain second video frames corresponding to each of the first video frames.

For example, when the resolutions of the first video frames are less than or equal to the resolution threshold, taking inserting a reference pixel point between two pixel points in the first video frame as an example, the terminal inserts a reference pixel point between the two pixel points, and the pixel value of the reference pixel point is an initial value, such as 0. The terminal updates the pixel value of any one of the two pixel points to the pixel value of the reference pixel point. This process embodies the idea of "nearest", that is, the pixel value of the reference pixel point is determined as the pixel value of the nearest pixel point, so that the resolution adjustment of the first video frame can be completed quickly to improve the resolution of the first video frame and get the second video frame. The terminal can process each of the first video frames in the above way to obtain a second video frame corresponding to each first video frame.

The terminal can not only insert a reference pixel between every two of pixels in one or more of, or in some embodiments, each of the first video frames in the above way, but also insert a plurality of reference pixels. Taking the terminal inserting two pixels between every two pixels in each first video frame as an example for explanation below.

For example, when the resolution of the first video frames is less than or equal to the resolution threshold, taking inserting two reference pixels between two pixels in the first video frame as an example, the terminal inserts a first reference pixel and a second reference pixel between the two pixels, and the pixel values of the first reference pixel and the second reference pixel are both initial values, such as 0. A terminal updates a pixel value of a first reference pixel point using a pixel value of a former pixel point in the two pixel points, and updates a pixel value of a second reference pixel point using a pixel value of a latter pixel point. The former pixel point in the two pixel points is a pixel point with a relatively short distance to the first reference pixel point, and accordingly, the latter pixel point in the two pixel points is a pixel point with a relatively short distance to the second reference pixel point. The way to distinguish "the former pixel point" and "the latter pixel point" in the above description is explained below. If the two pixel points are arranged from left to right on the first video frame, then the "former pixel point" is the left one of the two pixel points; and the "latter pixel" is the right one of the two pixels. If the two pixel points are arranged from top to bottom on the first video frame, then the "former pixel point" is the upper one of the two pixel points; and the "latter pixel" is the lower one of the two pixels.

In some embodiments, the terminal may adjust the resolution of the first video frame in the following ways to obtain the corresponding second video frame.

The terminal uses a bi-linear interpolation method to insert the reference pixel point between every two pixel points in each of the first video frames to obtain second video frames corresponding to each of the first video frames.

In some embodiments, the terminal inserts the reference pixel point between every two pixel points in the first video frames when the resolution of the plurality of first video frames is less than or equal to the resolution threshold, the pixel value of the reference pixel point being an initial pixel value, such as 0. The terminal updates the pixel value of the reference pixel point based on the distance between the reference pixel point and every two pixel points and the pixel values of the two pixel points.

Taking inserting two reference pixel points between two pixel points in a first video frame as an example, a terminal inserts a first reference pixel point and a second reference pixel point between the two pixel points, and the pixel values of the first reference pixel point and the second reference pixel point are initial pixel values, such as 0. The terminal determines two first weights between the first reference pixel and the two pixels based on the distance between the first reference pixel and the two pixels, the first weights being positively related to the distance. The terminal determines two second weights between the second reference pixel and the two pixels based on the distance between the second test pixel and the two pixels, the second weights being positively related to the distance. Based on the two first weights, the terminal carries out weighted summation on the pixel values of the two pixel points to obtain a first pixel value, and updates the pixel value of the first reference pixel point by using the first pixel value. Based on the two second weights, the terminal performs weighted summation on the pixel values of the two pixel points to obtain a second pixel value, and updates the pixel value of the second reference pixel point by using the second pixel value.

The above description takes inserting two reference pixel points between every two pixel points in the first video frame as an example. In other possible implementations, the terminal can insert three or more reference pixel points between every two pixel points in the above way, and this embodiment of this application does not limit the number of reference pixel points inserted.

In some embodiments, the terminal may adjust the resolution of the first video frame in the following ways to obtain the corresponding second video frame.

The terminal uses a mean interpolation method to insert the reference pixel point between every two pixel points in each of the first video frames to obtain second video frames corresponding to each of the first video frames.

In some embodiments, the terminal inserts the reference pixel point between every two pixel points in the first video frames when the resolution of the plurality of first video frames is less than or equal to the resolution threshold, the pixel value of the reference pixel point being an initial pixel value, such as 0. The terminal updates the pixel value of the reference pixel point based on the average value of the pixel values of every two pixel points.

In some embodiments, the terminal inputs the plurality of first video frames into a super-resolution model when the resolutions of the plurality of first video frames meet the resolution adjustment conditions, and performs up-sampling on the plurality of first video frames by the super-resolution model to obtain the plurality of second video frames.

The up-sampling process of the super-resolution model in the above implementation will be explained by several examples.

Example 1. For any one of a plurality of first video frames, the terminal performs feature extraction on the first video frame through the super-resolution model to obtain first video frame features of the first video frame. The terminal performs non-linear mapping on the first video frame feature through the super-resolution model to obtain a second video frame feature of the first video frame. The terminal reconstructs the second video frame feature through the super-resolution model to obtain a second video frame corresponding to the first video frame. In some embodiments, the up-sampling method provided in Example 1 is also referred to as post-sampling super-resolution, and the use of post-sampling super-resolution enables the super-resolution model to adaptively learn the up-sampling process, and also enables the feature extraction process to be performed in a low-dimensional space, which greatly reduces the computational burden and has faster training speed and reasoning speed.

For example, the terminal inputs the first video frame into the super-resolution model, and performs convolution on the first video frame through at least one convolution layer of the super-resolution model to obtain the first video frame feature of the first video frame. The terminal performs full connection and non-linear activation on the first video frame feature through the full connection layer and the activation layer of the super-resolution model to obtain the second video frame feature of the first video frame. The terminal reconstructs based on the feature of the second video frame through the reconstruction layer of the super-resolution model, where the reconstruction is up-sampling, which can increase the size of the first video frame, that is, increase the number of pixels in the first video frame, and the resolution of the obtained second video frame is higher than the corresponding first video frame. In some embodiments, the reconstruction layer of the super-resolution model is a deconvolution layer or a sub-pixel convolution layer, and the terminal can perform deconvolution on the feature of the second video frame through the deconvolution layer to obtain the second video frame, and can also perform deconvolution on the feature of the second video frame through the sub-pixel convolution layer to obtain the second video frame, and this embodiment of this application does not limit this.

The training process of the super-resolution model in Example 1 is described below.

In some embodiments, because the purpose of using the super-resolution model is to improve the resolution of a video frame, during the training, a plurality of high-resolution images and corresponding low-resolution images are used as training samples to train the super-resolution model. The low-resolution images are obtained by down-sampling the corresponding high-resolution images, and in some embodiments, the low-resolution images are also called damaged images. The terminal initializes the model parameters of the super-resolution model, inputs a low-resolution image into the super-resolution model, and performs convolution on the low-resolution image through at least one convolution layer of the super-resolution model to obtain the first sample image features of the low-resolution image. The terminal performs full connection and non-linear activation on the first sample image feature through the full connection layer and the activation layer of the super-resolution model to obtain a second sample image feature of the low-resolution image. Through the reconstruction layer of the super-resolution model, the terminal performs deconvolution on the image features of the second sample or performs convolution on sub-pixels, and outputs the super-resolution image corresponding to the low-resolution image The terminal adjusts the model parameters of the super-resolution model based on the difference information between the super-resolution image and the high-resolution image corresponding to the low-resolution image. In some embodiments, the difference information between the super-resolution image and the high-resolution image corresponding to the low-resolution image is at least one of a pixel value difference, an image feature difference, and a texture difference between the super-resolution image and the high-resolution image corresponding to the low-resolution image.

In some embodiments, the terminal can also train the super-resolution model by generating generative adversarial (GA), that is, a discriminator is introduced during the training process. The discriminator is used for scoring the image output by the super-resolution model, and the score is used for indicating the fidelity of the generated high-resolution image. The higher the score, the higher the probability that the discriminator considers the corresponding image as the generated image. The higher the score, the higher the probability that the discriminator considers the image to be a native image. After the terminal inputs the low-resolution image into the super-resolution model, the super-resolution image output by the super-resolution model is input into the discriminator, and the discriminator performs scoring based on the super-resolution image and outputs a score corresponding to the super-resolution image. Based on the score, the terminal adjusts the model parameters of the super-resolution model. In the next iteration, the terminal adjusts the parameters of the discriminator according to the difference information between the super-resolution image output by the super-resolution model and the corresponding high-resolution image. Through the "confrontation" between the super-resolution model and the discriminator, the up-sampling effect of the super-resolution model is improved.

The above is explained by taking the training of the super-resolution model by the terminal as an example. In other possible implementations, the super-resolution model can also be obtained by the cloud training, and the terminal directly acquires the super-resolution model from the cloud, and this embodiment of this application does not limit this.

Example 2. For any one of a plurality of first video frames, a terminal performs a plurality of up-sampling on the first video frame through the super-resolution model to obtain a second video frame corresponding to the first video frame. The up-sampling method provided in Example 2 is also called a step-by-step up-sampling super-resolution, a difficult task can be decomposed into a simple task using the step-by-step up-sampling super-resolution. The super-resolution model under the framework not only greatly reduces the learning difficulty, but also obtains better performance.

For example, the terminal inputs the first video frame into the super-resolution model, and performs convolution on the first video frame through at least one convolution layer of the super-resolution model to obtain the first video frame feature of the first video frame. The terminal performs up-sampling on the first video frame feature to obtain a first up-sampling feature through the up-sampling layer of the super-resolution model. The terminal performs convolution on the first up-sampling feature through at least one convolution layer of the super-resolution model to obtain the second video frame feature of the first video frame. The terminal reconstructs based on the feature of the second video frame through the reconstruction layer of the super-resolution model, where the reconstruction is up-sampling, which can increase the size of the first video frame, that is, increase the number of pixels in the first video frame, and the resolution of the obtained second video frame is higher than the corresponding first video frame. In some embodiments, the reconstruction layer of the super-resolution model is a deconvolution layer or a sub-pixel convolution layer, and the terminal can perform deconvolution on the feature of the second video frame through the deconvolution layer to obtain the second video frame, and can also perform deconvolution on the feature of the second video frame through the sub-pixel convolution layer to obtain the second video frame, and this embodiment of this application does not limit this.

The above is explained by taking the case where the terminal performs up-sampling on the first video frame twice through the super-resolution model as an example. In other possible implementations, the terminal can also perform up-sampling on the first video frame for three times or more times through the super-resolution model, and this embodiment of this application does not limit this.

Example 3. For any one of a plurality of first video frames, the terminal preforms up-sampling on the first video frame through the super-resolution model to obtain an up-sampled video frame corresponding to the first video frame. The number of pixel points in the up-sampled video frame is greater than that in the first video frame. The terminal performs feature extraction on the up-sampled video frame through the super-resolution model to obtain a first video frame feature of the up-sampled video frame. The terminal performs non-linear mapping on the first video frame feature through the super-resolution model to obtain a second video frame feature of the first video frame. The terminal performs deconvolution on the second video frame feature through the super-resolution model to obtain a second video frame corresponding to the first video frame. In some embodiments, the up-sampling method provided in Example 3 is also referred to as pre-up-sampling super-resolution, and the use of pre-up-sampling super-resolution can reduce the learning difficulty, and an arbitrary scale image can be obtained.

For example, the terminal inputs the first video frame into the super-resolution model, and performs up-sampling on the first video frame through an up-sampling layer of the super-resolution model to obtain an up-sampled video frame corresponding to the first video frame. The up-sampling layer can perform up-sampling on the first video frame by any one of the methods: the nearest interpolation method, the bi-linear interpolation method, and the mean interpolation method to obtain the up-sampled video frame, and this embodiment of this application does not limit this. A terminal performs convolution on an up-sampled video frame through at least one convolution layer of the super-resolution model to obtain a first video frame feature of the up-sampled video frame. The terminal performs full connection and non-linear activation on the first video frame feature through the full connection layer and the activation layer of the super-resolution model to obtain the second video frame feature of the up-sampled video frame. The terminal performs deconvolution on the features of the second video frame through the deconvolution layer of the super-resolution model to obtain the second video frame.

The training process of the super-resolution model in Example 3 is described below.

Because the purpose of using the super-resolution model is to improve the resolution of a video frame, during the training, a plurality of high-resolution images and corresponding low-resolution images are used as training samples to train the super-resolution model. The low-resolution images are obtained by down-sampling the corresponding high-resolution images, and in some embodiments, the low-resolution images are also called damaged images. Terminal initializes model parameters of the super-resolution model, inputs a low-resolution image into the super-resolution model, and up-samples the low-resolution image through an up-sampling layer of the super-resolution model to obtain an up-sampled image corresponding to the low-resolution image. The terminal performs convolution on the low-resolution image with at least one convolution layer of the super-resolution model to obtain a first sample image feature of the low-resolution image. The terminal performs full connection and non-linear activation on the first sample image feature through the full connection layer and the activation layer of the super-resolution model to obtain a second sample image feature of the low-resolution image. The terminal performs deconvolution on the second sample image feature through the deconvolution layer of the super-resolution model, and outputs a super-resolution image corresponding to the low-resolution image. The terminal adjusts the model parameters of the super-resolution model based on the difference information between the super-resolution image and the high-resolution image corresponding to the low-resolution image. In some embodiments, the difference information between the super-resolution image and the high-resolution image corresponding to the low-resolution image is at least one of a pixel value difference, an image feature difference, and a texture difference between the super-resolution image and the high-resolution image corresponding to the low-resolution image.

In some embodiments, the terminal can also train the super-resolution model by generating generative adversarial, that is, a discriminator is introduced during the training process. The discriminator is used for scoring the image output by the super-resolution model, and the score is used for indicating the fidelity of the generated high-resolution image. The higher the score, the higher the probability that the discriminator considers the corresponding image as the generated image. The higher the score, the higher the probability that the discriminator considers the image to be a native image. After the terminal inputs the low-resolution image into the super-resolution model, the super-resolution image output by the super-resolution model is input into the discriminator, and the discriminator performs scoring based on the super-resolution image and outputs a score corresponding to the super-resolution image. Based on the score, the terminal adjusts the model parameters of the super-resolution model. In the next iteration, the terminal adjusts the parameters of the discriminator according to the difference information between the super-resolution image output by the super-resolution model and the corresponding high-resolution image. Through the "confrontation" between the super-resolution model and the discriminator, the up-sampling effect of the super-resolution model is improved.

The above is explained by taking the training of the super-resolution model by the terminal as an example. In other possible implementations, the super-resolution model can also be obtained by the cloud training, and the terminal directly acquires the super-resolution model from the cloud, and this embodiment of this application does not limit this.

In addition, in addition to the up-sampling method described in the above three examples, the terminal can also use iterative up-sampling and variations of the above sampling methods to acquire a second video frame based on a first video frame. For example, the terminal uses an enhanced deep residual network for single image super-resolution (EDSR), and a wide activation for efficient and accurate image super-resolution (WDSR), and this embodiment of this application does not limit this.

404. The terminal performs frame insertion in a plurality of second video frames when frame rates of the plurality of second video frames meet frame rate conditions to obtain a plurality of second video frames after frame insertion.

The frame rate refers to the number of second video frames played by the terminal per second. The higher the frame rate, the more fluent the video formed by playing the second video frame; and the lower the frame rate, the more lag the video formed by playing the second video frame. As described in the above step 401, when the current network delay of the terminal is high, that is, the current network condition of the terminal is not good, the cloud game server can not only reduce the bandwidth occupied by transmitting the first video frame by reducing the resolution of the first video frame, but also reduce the number of first video frames, that is, reduce the bandwidth occupied by the transmission by reducing the frame rate of a plurality of first video frames. Step 404 is a method for performing frame insertion when the frame rate is low to improve the frame rate.

In some embodiments, the terminal inserts a reference video frame between every two of second video frames in the plurality of second video frames when the frame rate of the plurality of second video frames is less than or equal to the frame rate threshold to obtain the plurality of second video frames after the frame insertion. Every two of second video frames described herein refers to two second video frames that are adjacent chronologically.

In such an implementation, when the frame rate of the plurality of second video frames is low, the terminal can perform frame insertion between every two of the second video frames to increase the frame rate of the plurality of second video frames, and the increase of the frame rate can eliminate "interruption" and improve the playing effect of the plurality of second video frames.

On the basis of the above implementations, a method for determining a reference video frame by a terminal is described below.

In some embodiments, the terminal determines either of every two of second video frames as the reference video frame.

In such an implementation, the terminal can directly determine any second video frame of every two of second video frames as the reference video frame, without additional calculation by the terminal, and the efficiency of determining the reference video frame is high.

For example, for a second video frame A and a second video frame B that are adjacent chronologically, the terminal can directly determine the second video frame A or the second video frame B as a reference video frame, and subsequently directly add the reference video frame in between the second video frame A and the second video frame B. For example, if the terminal determines the second video frame A as the reference video frame, after the reference video frame between the second video frame A and the second video frame B are added, {second video frame A|second video frame A|second video frame B} is obtained. The original two video frames are extended to three video frames; and the terminal can display more video frames at the same time, shortening the display time between video frames, thereby improving the fluency of playing.

In some embodiments, the terminal determines the average video frame of every two of second video frames as the reference video frame, and a pixel value of a pixel point in the average video frame is an average of the pixel value of the corresponding pixel point in every two of second video frames.

In such an implementation, the terminal can directly determine the reference pixel point by calculating the average value, with less computation and higher efficiency in determining the reference video frame.

For example, for the second video frame A and the second video frame B which are adjacent chronologically, the terminal generates an average video frame based on the second video frame A and the second video frame B, the average video frame being the reference video frame. When the average video frame is generated, the terminal acquires a pixel value matrix M corresponding to the second video frame A and a pixel value matrix N corresponding to the second video frame B, and acquires an average pixel value matrix O of the pixel value matrix M and the pixel value matrix N. The terminal generates a blank video frame, the number and distribution of pixel points in the blank video frame are the same as those in the second video frame A and the second video frame B, and the terminal determines a numerical value in the average pixel value matrix O as a pixel value of a corresponding pixel point in the blank video frame to obtain a reference video frame. A subsequent terminal may add the reference video frame to the second video frame A and the second video frame B, that is, the original {second video frame A|second video frame B} is changed into {second video frame A|reference video frame-|second video frame B}. The original two video frames are extended to three video frames; and the terminal can display more video frames at the same time, shortening the display time between video frames, thereby improving the fluency of playing.

In some embodiments, the terminal inputs the second video frame sequence into a frame insertion model, and the frame insertion model generates a reference video frame based on two adjacent second video frames in the second video frame sequence, that is, the frame insertion model processes based on every two of second video frames to obtain the reference video frame.

In order to explain the above implementations more clearly, a method for acquiring reference video frames by terminal through frame insertion model will be explained by two examples.

Example 1. A terminal acquires a backward optical flow and a forward optical flow of two adjacent second video frames in the second video frame sequence through the frame insertion model, for example, acquiring a backward optical flow of a third video frame to a fourth video frame. The third video frame is a former second video frame in every two of second video frames, and the fourth video frame is a latter second video frame in every two of second video frames. The terminal acquires the forward optical flow from the fourth video frame to the third video frame through the frame insertion model. The terminal generates the reference video frame based on the backward optical flow and the forward optical flow through the frame insertion model.

In such an implementation, the terminal can generate a reference video frame based on an optical flow method, and the quality of the reference video frame is better, thereby improving the playing effect of the terminal on the video frame.

For example, the terminal acquires a first backward optical flow from the third video frame to the fourth video frame through the frame insertion model, and determines a second backward optical flow from a first moment to an intermediate moment of the third video frame based on the first backward optical flow, the intermediate moment being a moment between the third video frame and the fourth video frame. The terminal acquires a feature map and an edge image of the third video frame through the frame insertion model. The terminal performs forward mapping on a third video frame and a feature map and an edge image of the third video frame based on the second backward optical flow through the frame insertion model to obtain a first forward mapped video frame and first forward mapping reference information, the first forward mapping reference information including the feature map and the edge image of the first forward mapped video frame. The terminal acquires a first forward optical flow from a fourth video frame to a third video frame through the frame insertion model, and determines a second forward optical flow from a second moment to an intermediate moment of the fourth video frame based on the first forward optical flow, where the intermediate moment being a moment between the fourth video frame and the fourth video frame. The terminal acquires a feature map and an edge image of a fourth video frame through the frame insertion model. The terminal performs forward mapping on a fourth video frame and a feature map and an edge image of the fourth video frame based on the second forward optical flow through the frame insertion model to obtain a second forward mapped video frame and second forward mapping reference information, the second forward mapping reference information including the feature map and the edge image of the second forward mapped video frame. The terminal combines the first forward mapped video frame, the first forward mapped reference information, the second forward mapped video frame, and the second forward mapped reference information into a forward mapping result through the frame insertion model. The terminal determines a third backward optical flow from an intermediate moment to a second moment based on the first forward optical flow through the frame insertion model, and performs backward mapping on a fourth video frame and a feature map and an edge image of the fourth video frame based on the third backward optical flow to obtain a first backward mapped video frame and first backward mapping reference information, the first backward mapping reference information including the feature map and the edge image of the first backward mapped video frame. The terminal determines a third forward optical flow from an intermediate moment to a first moment based on the first backward optical flow through the frame insertion model, and performs backward mapping on a third video frame and a feature map and an edge image of the third video frame based on the third forward optical flow to obtain a second backward mapped video frame and second backward mapping reference information. The second backward mapping reference information includes the feature map and the edge image of the second backward mapped video frame. The terminal combines the first backward mapping video frame, the first backward mapping reference information, the second backward mapping video frame and the second backward mapping reference information into a backward mapping result through the frame insertion model. The terminal fuses the forward mapping result and the backward mapping result through the frame insertion model to obtain the reference video frame.

When the terminal fuses the forward mapping result and the backward mapping result through the frame insertion model to obtain the reference video frame, the terminal encodes the forward mapping result through the frame insertion model to obtain a forward intermediate feature to encode the backward mapping result to obtain a backward intermediate feature. The terminal fuses the forward intermediate feature and the backward intermediate feature through the frame insertion model to obtain the fused intermediate feature. The terminal decodes the fused intermediate feature through the frame insertion model to obtain the reference video frame.

Example 2. The terminal acquires motion vectors of a plurality of image blocks in a third video frame in a fourth video frame through the frame interpolation model. The third video frame is a former second video frame in two adjacent second video frames, and the fourth video frame is a latter second video frame in the two adjacent second video frames. The terminal generates the reference video frame based on the motion vector.

In such an implementation, the terminal can acquire a motion vector of an image block in a video frame, and generate a reference video frame based on the motion vector, and the quality of the generated reference video frame is high, and the effect of playing the video frame by the terminal is good.

For example, the terminal acquires coding information of the third video frame and the fourth video frame through the frame insertion model. The coding information is used for indicating the way of dividing the third video frame and the fourth video frame and a motion vector of each of image blocks in the third video frame from the third video frame to the fourth video frame. The terminal divides the third video frame and the fourth video frame into a plurality of image blocks based on encoding information of the third video frame through the frame insertion model, and determines a motion vector of each of the image blocks from the third video frame to the fourth video frame. Through the frame interpolation model, the terminal processes the motion vector corresponding to each of the image blocks to obtain the target motion vector corresponding to each image block. The terminal generates the reference video frame through each image block and the target motion vector of each of the image blocks. The processing of the motion vector corresponding to each of the image blocks by the terminal through the frame insertion model includes dividing the motion vector corresponding to each image block by a target value, that is, shortening the motion distance of the image block on the premise of ensuring that the motion direction of the image block remains unchanged, and the target value is set by a person skilled in the art according to actual situations, and this embodiment of this application does not limit this.

In addition to the frame insertion models described in Examples 1 and 2 above, the frame insertion model can also be other types of frame insertion models, such as real-time intermediate flow estimation for video frame interpolation (RIFE), video frame interpolation via residue refinement (RRIN), and multiple video frame interpolation via enhanced deformable separable convolution (EDSC), and the like, and this embodiment of this application does not limit this.

In addition, the above description is made in the order of a terminal first performing super-resolution on a first video frame (step 403), and then performing frame insertion on a plurality of super-resolution second video frames (step 404). In other possible embodiments, a terminal can also perform frame insertion on a plurality of first video frames, and then perform super-resolution on the plurality of frame inserted first video frames, and this embodiment of this application does not limit this.

405. The terminal plays the plurality of second video frames after frame insertion.

Through the above steps 401 to 405, compared with the acquired plurality of first video frames, the plurality of second video frames played by the terminal not only have higher resolution, but also have more numbers, the effect of playing video frames is better.

Figure 5:
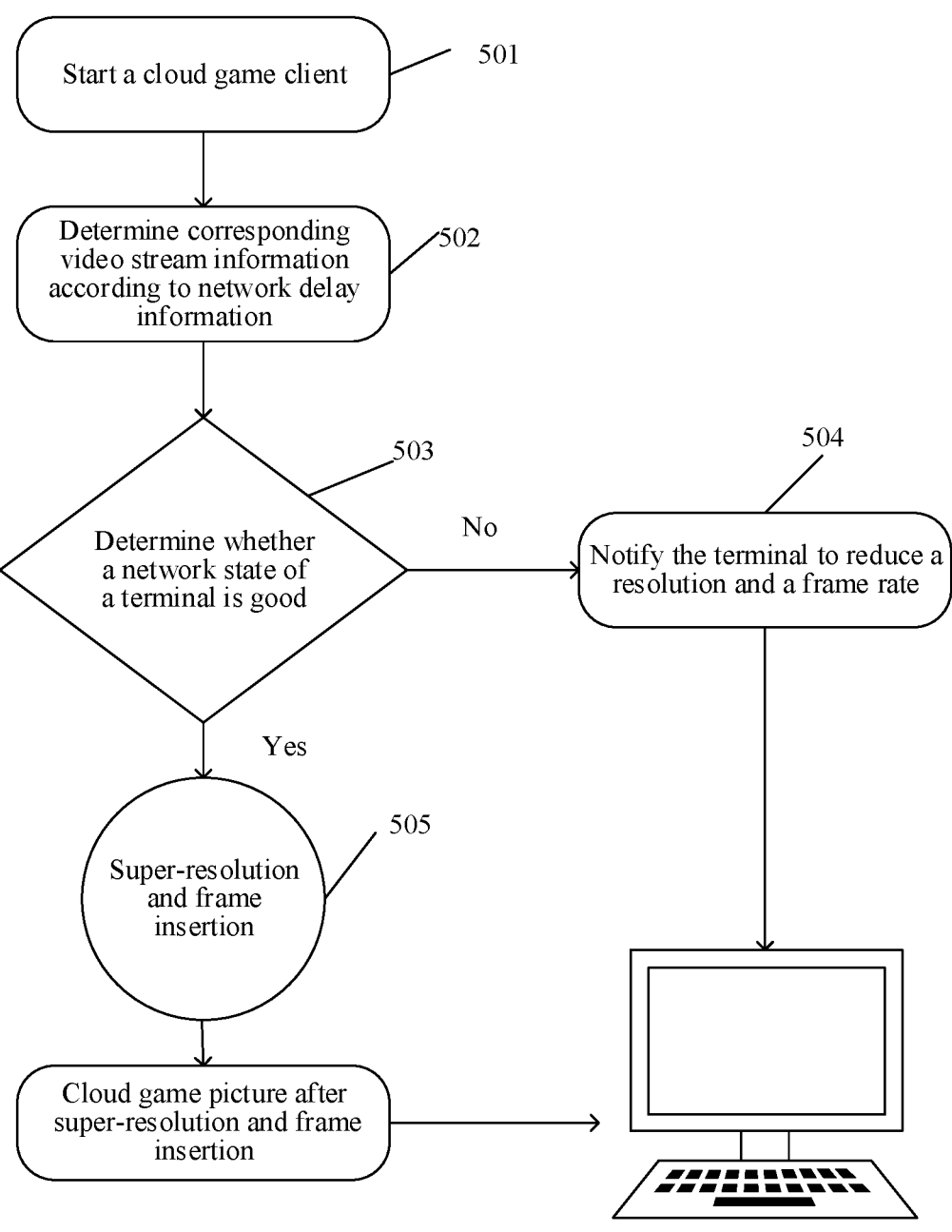
FIG. 5 is a flowchart of the video frame playing method provided by an embodiment of this application.

The video frame playing method provided by this embodiment of this application will be described below in combination with FIG. 5 and the above steps 401 to 405. Referring to FIG. 5, the video frame playing method provided by this embodiment of this application includes:

Step 501. A terminal starts a cloud game client.

Current network delay information of the terminal is acquired through the cloud game client.

Step 502. The terminal determines corresponding video stream information according to the network delay information.

Here, the video stream information includes a resolution, a frame rate, and a code rate.

Step 503. Determine whether the network state of the terminal is good, and if so, execute step 505, otherwise, execute step 504.

The cloud game server determines rendering parameters based on the video stream information, and renders the target virtual scene by the cloud game server to obtain a first video frame. Determine whether the network state of the terminal is good or not according to the network delay information. When the network delay information indicates that the current network state of the terminal is not good (that is, the network delay is greater than or equal to the network delay threshold), step 504 is triggered; and when the network delay information indicates that the current network state of the terminal is good (that is, the network delay is less than the network delay threshold), step 505 is triggered.

Step 504. The cloud game server notifies the terminal to reduce a resolution and a frame rate.

Step 505. Super-resolution and frame insertion.

The terminal determines based on a plurality of acquired first video frames, but when super-resolution and frame insertion are needed, super-resolution and frame insertion are performed on the acquired first video frames to obtain a plurality of second video frames after frame insertion. The terminal plays the plurality of second video frames, which are cloud game pictures after super-resolution and frame insertion. For example, the current network or terminal configuration is not good, and the video stream received from the cloud game server is 480 P/15 FPS, 720 P/30 FPS, or 1080 P/60 FPS, and the like. The users can choose whether to perform super-resolution and frame insertion to 720 P/30 FPS, 1080 P/60 FPS, or 4K/90 FPS according to experience habits and terminal computing power.

An embodiment of this application may be formed by using any combination of all the foregoing technical solutions, and details are not described herein.

Figure 6:
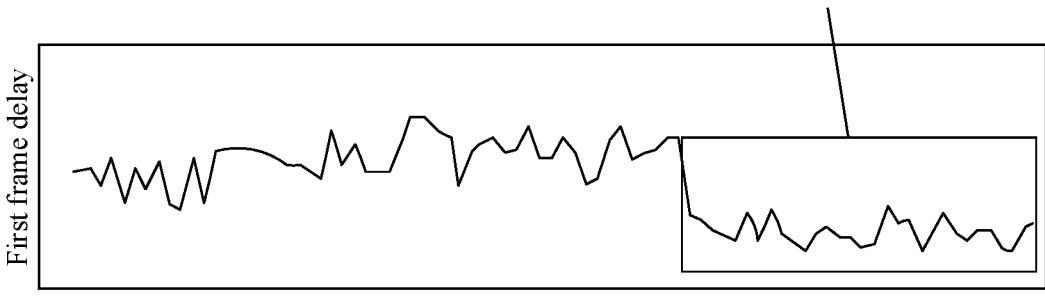
FIG. 6 is a graph showing a change of first frame delay provided by an embodiment of this application.
Figure 7:
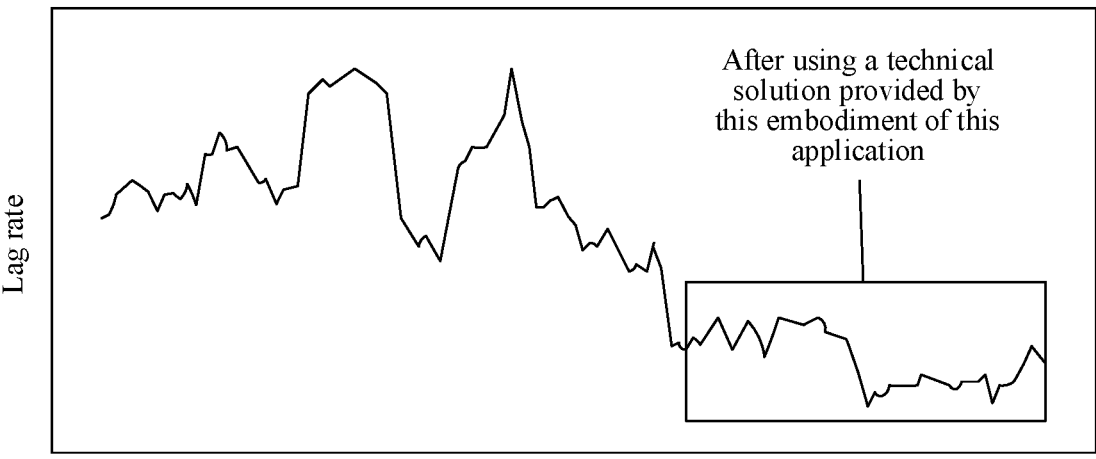
FIG. 7 is a graph showing a change of a lag rate provided by an embodiment of this application.

FIG. 6 and FIG. 7 provide the changes of the first frame delay and the stuck rate after using the video frame playing method provided by this embodiment of this application. As can be seen from FIG. 6, after the video frame playing method provided by this embodiment of this application is used, the first frame delay is reduced by more than 100 ms, and a lag rate is reduced by more than 50%.

According to the technical solutions provided by this embodiment of this application, after the plurality of first video frames transmitted by the cloud game server are acquired, the resolutions of the plurality of first video frames are determined. The resolution of each of first video frames are adjusted when the resolutions meet resolution adjustment conditions, to improve the resolutions of the first video frames to obtain the corresponding second video frames, so the plurality of second video frames have higher resolutions. Therefore, on the premise of ensuring the fluency of the cloud game, the display effect of the cloud game is improved.

According to the technical scheme provided by this embodiment of this application, for the terminal with unstable network, the cloud game server can switch to low-resolution and low-FPS acquisition coding, which can greatly reduce the code rate of the acquisition coding of the cloud game server, reduce the network bandwidth pressure of the terminal with unstable network, and make the transmission more stable and fluent. For example, for a terminal with network instability, the code rate of the cloud game server acquisition encoding 720 P/30 FPS can save more than 400% of network bandwidth compared with 1080 P/60 FPS; then the terminal performs super-resolution and frame insertion to 1080 P/60 FPS through frame insertion and super-resolution technology. The difference between the quality experience of cloud games and the subjective experience MOS (mean opinion score) of 1080 P/60 FPS is less than 5%, but the code rate is saved by more than 400%, which greatly improves the situation that the network is unstable but the terminal has good computing power.

Figure 8:
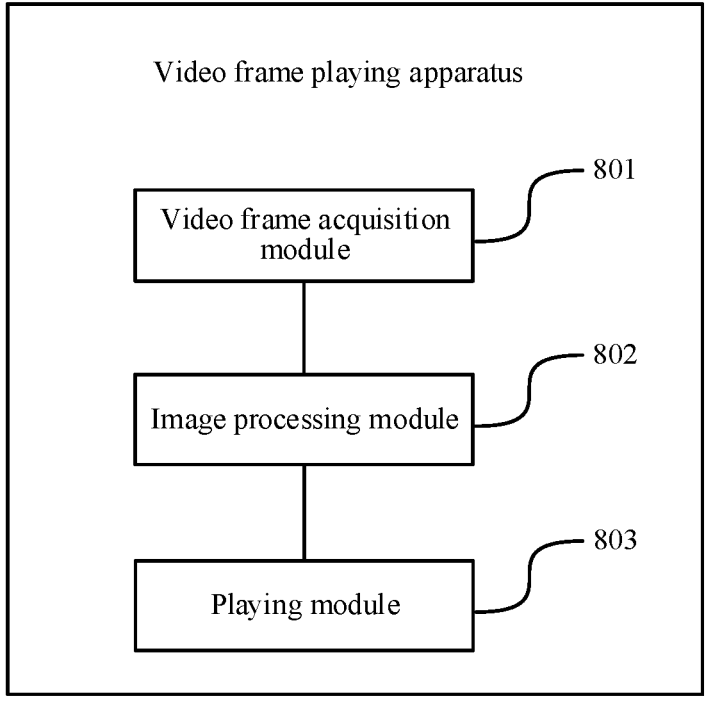
FIG. 8 is a schematic structural diagram of a video frame playing apparatus provided by an embodiment of this application.

FIG. 8 is a schematic structural diagram of a video frame playing apparatus provided by an embodiment of this application. Referring to FIG. 8, the apparatus includes: a video frame acquisition module 801, a resolution adjustment module 802, and a playing module 803.

A video frame acquisition module 801 is configured to acquire a plurality of first video frames, the plurality of first video frames being video frames obtained by rendering a target virtual scene by a cloud game server.

A resolution adjustment module 802 is configured to adjust a resolution of each of the first video frames when resolutions of the plurality of first video frames meet resolution adjustment conditions to obtain corresponding second video frames, resolutions of the second video frames being higher than those of corresponding first video frames.

A playing module 803 is configured to play a plurality of the second video frames obtained by adjusting resolutions.

In some embodiments, the resolution adjustment module 802 is further configured to determine, for one or more of, or in some embodiments, each of the first video frames, a reference pixel point between every two pixel points in the one or more, or in some embodiments, each first video frame and insert the reference pixel point between the every two pixel points to obtain a second video frame corresponding to each first video frame, the reference pixel point being generated based on the every two pixel points.

In some embodiments, the resolution adjustment module 802 is configured to perform any of the following:

inserting the reference pixel point between every two pixel points in each of the first video frames using a nearest interpolation method;

inserting the reference pixel point between every two pixel points in each of the first video frames using a bi-linear interpolation method; and inserting the reference pixel point between every two pixel points in each of the first video frames using a mean interpolation method.

In some embodiments, the resolution adjustment module 802 is further configured to input each of the first video frames into a super-resolution model, and perform up-sampling on each of the first video frames by the super-resolution model to obtain corresponding second video frames.

In some embodiments, the resolution adjustment module 802 is configured to perform feature extraction on a first video frame through the super-resolution model to obtain a first video frame feature of the first video frame for any one of the plurality of first video frames, perform non-linear mapping on the first video frame feature to obtain a second video frame feature of the first video frame, and reconstruct video frame based on the second video frame feature to obtain a second video frame corresponding to the first video frame.

In some embodiments, the apparatus further includes:

a frame insertion module, configured to perform frame insertion among a plurality of the second video frames to obtain a plurality of second video frames after frame insertion.

The playing module 803 is further configured to play a plurality of the second video frames after the frame insertion.

In some embodiments, the frame insertion module is configured to insert a reference video frame between every two of the second video frames when a frame rate of a plurality of the second video frames is less than or equal to a frame rate threshold to obtain a plurality of the second video frames after the frame insertion.

In some embodiments, the apparatus further includes a reference frame determination module, configured to perform any of the following:

determining any one of the every two of second video frames as the reference video frame;

determining an average video frame of the every two of second video frames as the reference video frame, a pixel value of a pixel point in the average video frame being an average value of a pixel value of a corresponding pixel point in the every two of second video frames; and inputting a second video frame sequence composed of a plurality of the second video frames into a frame insertion model, and generating the reference video frame by the frame insertion model based on two adjacent second video frames in the second video frame sequence.

In some embodiments, the reference frame determination module is configured to generate the reference video frame based on the backward optical flow and the forward optical flow of two adjacent second video frames in the second video frame sequence through the frame insertion model. For example, a backward optical flow is acquired from a third video frame, which is a former second video frame in every two of second video frames, to a fourth video frame, which is a latter second video frame in every two of the second video frames. A forward optical flow from the fourth video frame to the third video frame is acquired. generating the reference video frame based on the backward optical flow and the forward optical flow.

In some embodiments, the reference frame determination module is configured to acquire motion vectors of a plurality of image blocks in a third video frame in a fourth video frame through the frame interpolation model. The third video frame is a former second video frame in two adjacent second video frames, and the fourth video frame is a latter second video frame in the two adjacent second video frames. The reference video frame is generated based on the motion vector.

In some embodiments, the apparatus further includes:

a transmitting module, configured to send network delay information to the cloud game server to cause the cloud game server to generate the plurality of first video frames based on the network delay information.

The video frame playing apparatus provided in the above embodiments only illustrates the division of the above various functional modules when playing a video frame. In practical applications, the above functional allocation can be completed by different functional modules according to needs, that is, the internal structure of computer device is divided into different functional modules to complete all or part of the functions described above. In addition, the video frame playing apparatus provided by the above embodiments belongs to the same concept as this embodiment of the video frame playing method, and the implementation process is described in detail in this embodiment of the method and will not be described in detail here.

According to the technical solutions provided by this embodiment of this application, after the plurality of first video frames transmitted by the cloud game server are acquired, the resolutions of the plurality of first video frames are determined. The resolution of each of first video frames are adjusted when the resolutions meet resolution adjustment conditions, to improve the resolutions of the first video frames to obtain the corresponding second video frames. Then the plurality of second video frames obtained by adjusting the resolutions of the first video frames are played. Compared with directly playing the plurality of first video frames transmitted by the cloud game server, the clarity of the cloud game picture is improved. Therefore, on the premise of ensuring the fluency of the cloud game, the display effect of the cloud game is improved.

This embodiment of this application provides a computer device configured to execute the video frame playing method provided by this embodiment of this application, the computer device being implemented as a terminal or a server, and the structure of the terminal is introduced below.

Figure 9:
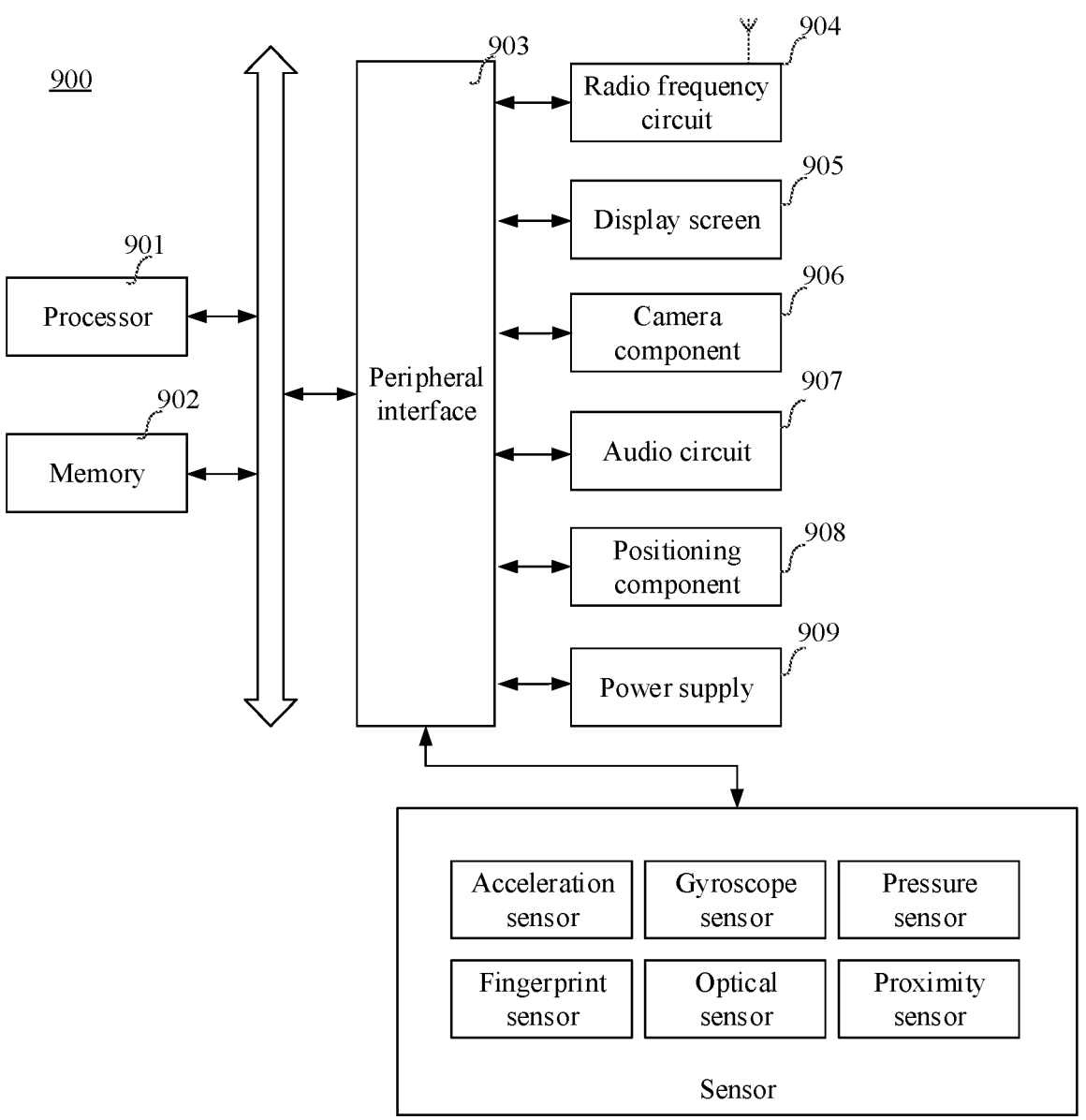
FIG. 9 is a schematic structural diagram of a terminal according to an embodiment of this application.

FIG. 9 is a schematic structural diagram of a terminal according to an embodiment of this application. The terminal 900 may be a smart phone, a tablet computer, a notebook computer, or a desktop computer. The terminal 900 may also be referred to as another name such as user device, a portable terminal, a laptop terminal, or a desktop terminal.

Generally, the terminal 900 includes one or more processors 901 and one or more memories 902.

The processor 901 may include one or more processing cores, for example, a 4-core processor or an 8-core processor. The processor 901 can be implemented in at least one hardware form of digital signal processing (DSP), field-programmable gate array (FPGA), and programmable logic array (PLA). The processor 901 may also include a main processor and a co-processor. The main processor is a processor for processing data in an awake state, also called a central processing unit (CPU); and a co-processor is a low-power processor for processing data in a standby state. In some embodiments, the processor 901 may be integrated with a resolution graphics processing unit (GPU). The GPU is responsible for rendering and drawing the content to be displayed on the display screen. In some embodiments, processor 901 may further include an artificial intelligence (AI) processor for processing computing operations related to machine learning.

The memory 902 may include one or more computer-readable storage media. The computer-readable storage medium may be non-transient. The memory 902 may further include a high-speed random access memory and a nonvolatile memory, for example, one or more disk storage devices or flash storage devices. In some embodiments, a non-transitory computer-readable storage medium in memory 902 is configured to store at least one computer program for execution by processor 901 to implement the video frame playing method provided by the method embodiments of this application.

In some embodiments, the terminal 900 further includes a peripheral interface 903 and at least one peripheral. The processor 901, the memory 902, and the peripheral interface 903 may be connected by buses or signal lines. Each peripheral may be connected to the peripheral interface 903 through a bus, a signal line, or a circuit board. In practice application, the peripheral includes: at least one of a radio frequency circuit 904, a display screen 905, a camera component 906, an audio circuit 907, a positioning component 908, and a power supply 909.

The peripheral interface 903 may be configured to connect at least one input/output (I/O) related peripheral to the processor 901 and the memory 902. In some embodiments, the processor 901, the memory 902, and the peripheral interface 903 are integrated on the same chip or circuit board. In some other embodiments, any one or both of the processor 901, the memory 902, and the peripheral interface 903 may be implemented on a separate chip or circuit board, which is not a limitation of the present embodiment.

The radio frequency circuit 904 is configured to receive and transmit radio frequency (RF) signals, also called electromagnetic signals. The radio frequency circuit 904 communicates with a communication network and other communication devices through the electromagnetic signal. The radio frequency circuit 904 converts electrical signals into electromagnetic signals for transmission, or converts received electromagnetic signals into electrical signals. In some embodiments, the radio frequency circuit 904 includes: an antenna system, an RF transceiver, one or more amplifiers, a tuner, an oscillator, a digital signal processor, a codec chipset, a subscriber identity module card, and the like.

The display screen 905 is configured to display a user interface (UI). The UI may include a graph, text, an icon, a video, and any combination thereof. When the display screen 905 is a touch display screen, the display screen 905 also has the ability to collect touch signals at or above the surface of the display screen 905. The touch signal may be inputted to the processor 901 as a control signal for processing. At this time, the display screen 905 may also be configured to provide virtual buttons and/or virtual keyboards, also called soft buttons and/or soft key boards.

The camera component 906 is configured to capture images or videos. In some embodiments, the camera component 906 includes a front camera and a rear camera. Generally, the front-facing camera is disposed on the front panel of the terminal, and the rear-facing camera is disposed on a back surface of the terminal.

The audio circuit 907 may include a microphone and a speaker. The microphone is configured to acquire sound waves of a user and an environment, and convert the sound waves into an electrical signal to input to the processor 901 for processing, or input to the radio frequency circuit 904 for implementing voice communication.

The positioning component 908 is configured to locate the current geographic location of the terminal 900 to implement navigation or location-based services (LBS).

The power supply 909 is configured to supply power to components in the terminal 900. The power supply 909 may be alternating current, direct current, disposable battery, or rechargeable battery.

It can be understood by a person skilled in the art that the structure shown in FIG. 9 is not limited to the terminal 900, and may include more or less components than shown, or combine some components, or use different component arrangements.

Embodiments of this application also provide a computer-readable storage medium, such as a memory, including a computer program executable by a processor to complete the video frame playing method in the embodiments described above. For example, the computer-readable storage medium may be a read-only memory (ROM), a random access memory (RAM), a compact disc read-only memory (CD-ROM), a magnetic tape, a floppy disk, an optical data storage device, and the like.

This embodiment of this application further provides a computer program product or a computer program including program codes stored in a computer-readable storage medium, a processor of a computer device reading the program codes from the computer-readable storage medium, and the processor executing the program codes to cause the computer device to execute the above video frame playing method.

In some embodiments, a computer program according to an embodiment of this application may be deployed to be executed on one computer device, or on a plurality of computer devices located at one site, or on a plurality of computer devices distributed at a plurality of sites and interconnected through communication networks, and the plurality of computer devices distributed at the plurality of sites and interconnected through communication networks may form a block chain system.

A person of ordinary skill in the art may understand that all or some of the steps of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

The above is only an embodiment of this application, and it is not used to limit this application. Any modification, equivalent substitution, improvement and the like made within the spirit and principle of this application is included in the protection scope of this application.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The invention claimed is:

1. A method performed by a computer device, comprising:
transmitting network delay information to a cloud game server;
acquiring a plurality of first video frames from the cloud game server, wherein the cloud game server generates the plurality of first video frames based at least by:
determining rendering parameters based on the network delay information, and
rendering a target virtual scene based on the rendering parameters and a visual angle of a controlled virtual object in the target virtual scene;
determining whether resolutions of the plurality of first video frames meets resolution adjustment conditions, and
adjusting the resolutions of the plurality of first video frames when the resolution adjustment conditions are met, based at least by
for each of the first video frames:
inputting the first video frame into a super-resolution model, performing convolution processing on the first video frame through at least one convolution layer of the super-resolution model to obtain a first video frame feature of the first video frame, performing up-sampling on the first video frame feature through an up-sampling layer of the super-resolution model to obtain a first up-sampling feature, convolving the first up-sampling feature through at least one convolution layer of the super-resolution model to obtain a second video frame feature of the first video frame, and reconstructing a video frame based on the second video frame feature to obtain a second video frame corresponding to the first video frame, wherein a resolution of the second video frame is higher than that of the first video frame, and obtaining the plurality of second video frames based on the video frames reconstructed from each of the first video frames; and displaying the plurality of second video frames.

2. The method according to claim 1, wherein the adjusting a resolution of the first video frames comprises:

for one or more of the first video frames, determining a reference pixel point based on every two pixel points in the first video frame; and inserting the reference pixel point between the every two pixel points to obtain the second video frame corresponding to the first video frame.

3. The method according to claim 2, wherein the determining the reference pixel point based on every two pixel points in the first video frame comprises at least one of the following:

determining the reference pixel point between the every two pixel points in the first video frame using a nearest interpolation method;

determining the reference pixel point between the every two pixel points in the first video frame using a bi-linear interpolation method; and determining the reference pixel point between the every two pixel points in the first video frame using a mean interpolation method.

4. The method according to claim 1, wherein the method further comprises:

performing frame insertion among a plurality of the second video frames to obtain a plurality of second video frames after frame insertion; and displaying the plurality of second video frames after frame insertion.

5. The method according to claim 4, wherein the method further comprises:

inserting a reference video frame between every two of the second video frames when a frame rate of the second video frames is less than or equal to a frame rate threshold.

6. The method according to claim 5, wherein the reference video frame is determined as:

one of the every two of the second video frames; or an average video frame of the every two of the second video frames, a pixel value of a pixel point in the average video frame being an average value of a pixel value of a corresponding pixel point in the every two of the second video frames; or a video frame outputted by a frame insertion model, wherein the video frame is generated by the frame insertion model based on two adjacent second video frames in a second video frame sequence.

7. A computer device comprising one or more processors and one or more memories, the one or more memories having stored therein at least one computer program that, when executed by the one or more processors, causes the computer device to perform a method including:

transmitting network delay information to a cloud game server;

acquiring a plurality of first video frames from the cloud game server, wherein the cloud game server generates the plurality of first video frames based at least by:

determining rendering parameters based on the network delay information, and rendering a target virtual scene based on the rendering parameters and a visual angle of a controlled virtual object in the target virtual scene;

determining whether resolutions of the plurality of first video frames meets resolution adjustment conditions, and adjusting the resolutions of the plurality of first video frames when the resolution adjustment conditions are met, based at least by for each of the first video frames:

inputting the first video frame into a super-resolution model, performing convolution processing on the first video frame through at least one convolution layer of the super-resolution model to obtain a first video frame feature of the first video frame, performing up-sampling on the first video frame feature through an up-sampling layer of the super-resolution model to obtain a first up-sampling feature, convolving the first up-sampling feature through at least one convolution layer of the super-resolution model to obtain a second video frame feature of the first video frame, and reconstructing a video frame based on the second video frame feature to obtain a second video frame corresponding to the first video frame, wherein a resolution of the second video frame is higher than that of the first video frame, and obtaining the plurality of second video frames based on the video frames reconstructed from each of the first video frames; and displaying the plurality of second video frames.

8. The computer device according to claim 7, wherein the adjusting a resolution of the first video frames comprises:

for one or more of the first video frames, determining a reference pixel point based on every two pixel points in the first video frame; and inserting the reference pixel point between the every two pixel points to obtain the second video frame corresponding to the first video frame.

9. The computer device according to claim 8, wherein the determining the reference pixel point based on every two pixel points in the first video frame comprises at least one of the following:

determining the reference pixel point between the every two pixel points in the first video frame using a nearest interpolation method;

determining the reference pixel point between the every two pixel points in the first video frame using a bi-linear interpolation method; and determining the reference pixel point between the every two pixel points in the first video frame using a mean interpolation method.

10. The computer device according to claim 7, wherein the method further comprises:

performing frame insertion among a plurality of the second video frames to obtain a plurality of second video frames after frame insertion; and displaying the plurality of second video frames after frame insertion.

11. A non-transitory computer-readable storage medium having stored therein at least one computer program that, when executed by a processor of a computer device, causes the computer device to implement a method comprising:

transmitting network delay information to a cloud game server;

acquiring a plurality of first video frames from the cloud game server, wherein the cloud game server generates the plurality of first video frames based at least by:

determining rendering parameters based on the network delay information, and rendering a target virtual scene based on the rendering parameters and a visual angle of a controlled virtual object in the target virtual scene;

determining whether resolutions of the plurality of first video frames meets resolution adjustment conditions, and adjusting the resolutions of the plurality of first video frames when the resolution adjustment conditions are met, based at least by for each of the first video frames:

inputting the first video frame into a super-resolution model, performing convolution processing on the first video frame through at least one convolution layer of the super-resolution model to obtain a first video frame feature of the first video frame, performing up-sampling on the first video frame feature through an up-sampling layer of the super-resolution model to obtain a first up-sampling feature, convolving the first up-sampling feature through at least one convolution layer of the super-resolution model to obtain a second video frame feature of the first video frame, and reconstructing a video frame based on the second video frame feature to obtain a second video frame corresponding to the first video frame, wherein a resolution of the second video frame is higher than that of the first video frame, and obtaining the plurality of second video frames based on the video frames reconstructed from each of the first video frames; and displaying the plurality of second video frames.

12. The non-transitory computer-readable storage medium according to claim 11, wherein the adjusting a resolution of the first video frames comprises:

for one or more of the first video frames, determining a reference pixel point based on every two pixel points in the first video frame; and inserting the reference pixel point between the every two pixel points to obtain the second video frame corresponding to the first video frame.

13. The non-transitory computer-readable storage medium according to claim 12, wherein the determining the reference pixel point based on every two pixel points in the first video frame comprises at least one of the following:

determining the reference pixel point between the every two pixel points in the first video frame using a nearest interpolation method;

determining the reference pixel point between the every two pixel points in the first video frame using a bi-linear interpolation method; and determining the reference pixel point between the every two pixel points in the first video frame using a mean interpolation method.

14. The non-transitory computer-readable storage medium according to claim 11, wherein the method further comprises:

performing frame insertion among a plurality of the second video frames to obtain a plurality of second video frames after frame insertion; and displaying the plurality of second video frames after frame insertion.

* * * * *